United States Patent
Zhong et al.

(10) Patent No.: US 9,379,604 B2
(45) Date of Patent: Jun. 28, 2016

(54) LOW NOISE RADIO FREQUENCY SWITCHING CIRCUITRY

(71) Applicant: RF Micro Devices, Inc., Greensboro, NC (US)

(72) Inventors: Jinhua Zhong, High Point, NC (US); Daniel Charles Kerr, Oak Ridge, NC (US); Kelvin Kai Tuan Yan, Oak Ridge, NC (US); Brian Keith White, Greensboro, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 165 days.

(21) Appl. No.: 13/946,340

(22) Filed: Jul. 19, 2013

(65) Prior Publication Data

US 2014/0210436 A1    Jul. 31, 2014

Related U.S. Application Data

(60) Provisional application No. 61/758,233, filed on Jan. 29, 2013.

(51) Int. Cl.
*H04B 1/44* (2006.01)
*H02M 3/07* (2006.01)
*H02M 1/00* (2006.01)

(52) U.S. Cl.
CPC ........ *H02M 3/07* (2013.01); *H02M 2001/0032* (2013.01); *Y02B 70/16* (2013.01)

(58) Field of Classification Search
CPC .......... H04M 1/72522; H04M 1/0214; H04M 1/72519; H04B 1/48; H04B 1/44; H04B 1/18; H04B 1/406; H04B 1/525; H04B 1/28; H04B 1/30; H04B 11/04

USPC .............. 455/77, 78, 118, 120, 127.1, 127.2, 455/313, 323, 334, 550.1; 323/271
See application file for complete search history.

(56) References Cited

U.S. PATENT DOCUMENTS

| | | | | | |
|---|---|---|---|---|---|
| 6,137,732 | A | * | 10/2000 | Inaba | G11C 16/30 365/189.09 |
| 2009/0280757 | A1 | * | 11/2009 | Zhu et al. | 455/114.1 |
| 2011/0037527 | A1 | * | 2/2011 | Shrivastava et al. | 331/158 |
| 2014/0210436 | A1 | * | 7/2014 | Zhong et al. | 323/271 |

OTHER PUBLICATIONS

Wang, Li-Kong et al., "The Conversion of Bulk CMOS Circuits to SOI Technology and Its Noise Impact," International Symposium on VLSI Technology, Systems and Application, 1999, pp. 282-285.
Yoon, Sunwoo et al., "A 34 dBm IP0.1dB SOI SP3T Switch with an Integrated Negative-Bias Switch Controller at 2.4 GHz," International SoC Design Conference (ISOCC), Nov. 17-18, 2011, pp. 235-237.

* cited by examiner

*Primary Examiner* — Nhan Le
(74) *Attorney, Agent, or Firm* — Withrow & Terranova, P.L.L.C.

(57) ABSTRACT

Radio frequency (RF) switching circuitry includes support circuitry for maintaining one or more RF switching elements in either an ON or OFF state. The support circuitry includes a negative charge pump adapted to quickly generate a negative voltage during a "boost" mode of operation, and maintain the negative voltage during a normal mode of operation. The negative charge pump includes an oscillator adapted to generate a high frequency oscillating signal for driving the charge pump during the boost mode of operation and a low frequency oscillating signal for driving the charge pump during the normal mode of operation. By generating the high frequency oscillating signal only during a boost mode of operation, spurious noise coupled to the RF switch circuitry is minimized during a normal mode of operation.

18 Claims, 10 Drawing Sheets

LOW NOISE RADIO FREQUENCY SWITCHING CIRCUITRY

RELATED APPLICATIONS

This application claims the benefit of provisional patent application Ser. No. 61/758,233, filed Jan. 29, 2013, the disclosure of which is hereby incorporated by reference in its entirety.

FIELD OF THE DISCLOSURE

The present disclosure relates to radio frequency switching circuitry. In particular, the present disclosure relates to biasing circuitry for controlling the state of radio frequency switching circuitry.

BACKGROUND

Radio frequency (RF) devices such as cellular telephones generally include RF switching circuitry for directing the flow of RF signals within the device. The RF switching circuitry may be comprised of one or more RF switching elements arranged in a series or shunt configuration. Each one of the switching elements may be adapted to maintain either an ON state or an OFF state, depending on a control signal applied to the switching element. Accordingly, RF switching circuitry often includes switching support circuitry in order to maintain the switching elements in a desired state.

FIG. 1 shows an example of conventional RF switching circuitry 10. The conventional RF switching circuitry 10 includes a low-dropout voltage regulator 12, biasing circuitry 14, input circuitry 16, switch driver circuitry 18, and one or more RF switching elements 20. The low-dropout voltage regulator 12 is coupled to the biasing circuitry 14, the input circuitry 16, and the switch driver circuitry 18. An output of the biasing circuitry 14 is coupled to the switch driver circuitry 18. The input circuitry includes one or more input control terminals 22 and an output coupled to the switch driver circuitry 18. The output of the switch driver circuitry is coupled to the RF switching elements 20. Each one of the low-dropout voltage regulator 12, the biasing circuitry 14, the input circuitry 16, the switch driver circuitry 18, and the RF switching elements 20 are coupled to a common ground 24.

In operation, the low-dropout voltage regulator 12 receives a battery voltage V_BATT and generates a regulated supply voltage V_SUPP. The biasing circuitry 14 receives the regulated supply voltage V_SUPP from the low-dropout voltage regulator 12 and generates a biasing signal V_BIAS for maintaining the RF switching elements 20 in either an ON state or an OFF state. The input circuitry 16 receives one or more input control signals V_INC from the input control terminals 22, and processes the input control signals V_INC to generate one or more processed input control signals V_INP. The switch driver circuitry 18 uses one or more of the processed input control signals V_INP from the input circuitry 16 together with the biasing signal V_BIAS from the biasing circuitry 14 and the supply voltage V_SUPP from the low-dropout voltage regulator 12 to maintain each one of the RF switching elements 20 in either an ON state or an OFF state. Each one of the processed input control signals V_INP controls the state of one of the RF switching elements 20. Based on the state of each one of the RF switching elements 20, an RF signal presented at an input terminal 26 of the conventional RF switching circuitry 10 is selectively passed to an output terminal 28 of the conventional RF switching circuitry 10.

Although effective at directing the flow of RF signals, the conventional RF switching circuitry 10 may introduce spurious noise into RF signals passing through each switching element in the RF switching elements 20, as will be discussed in further detail below. Accordingly, the performance of a device incorporating the conventional RF switching circuitry 10 will suffer.

FIGS. 2A and 2B show exemplary configurations of the RF switching elements 20 shown in FIG. 1. Specifically, FIG. 2A shows four RF switching elements RF_SW coupled in series between an input terminal 26 and ground. According to one embodiment, each one of the RF switching elements RF_SW is a metal-oxide-semiconductor field-effect transistor (MOSFET) however; any type of switching device including a field-effect transistor (FET), a metal semiconductor field-effect transistor (MESFET), a bipolar junction transmitter (BJT), or the like may be used without departing from the principles of the present disclosure. Although the control terminals of each one of the RF switching elements RF_SW are shown coupled together into a single control terminal 30, the control terminals of each RF switching device RF_SW may also be individually controlled. Additional circuitry such as multiplexers and de-multiplexers (not shown) may be used to relay the control information for each RF switching device RF_SW between the input circuitry 16 and the RF switching elements 20. FIG. 2B shows four RF switching elements RF_SW coupled in series between an input terminal 26 and an output terminal 28. By coupling the RF switching elements RF_SW in series, an RF signal present at the input terminal 26 is distributed evenly across the elements, thereby allowing the RF switching elements 20 to effectively direct high amplitude RF signals.

FIG. 3 shows an example of the conventional biasing circuitry 14 shown in FIG. 1. For context, the low-dropout voltage regulator 12 is also shown. The conventional biasing circuitry 14 is a negative charge pump including an oscillator 32, charge pump switching circuitry 34, and an output capacitor 36. The low-dropout voltage regulator 12 is coupled to the oscillator 32 and the charge pump switching circuitry 34. An output of the oscillator 32 is coupled to the charge pump switching circuitry 34. An output of the charge pump switching circuitry 34 is coupled to the output capacitor 36, which is coupled between the output of the charge pump switching circuitry 34 and ground.

In operation, the oscillator 32 receives the supply voltage V_SUPP from the low-dropout voltage regulator 12 and generates an oscillating signal V_OSC. The oscillating signal V_OSC is delivered to the charge pump switching circuitry 34, where it is used to generate a stepped-up output voltage V_SU from the supply voltage V_SUPP. The stepped-up output voltage V_SU is then filtered by the output capacitor 36 to generate the biasing signal V_BIAS.

Although effective at generating a biasing signal V_BIAS for maintaining the RF switching elements 20 in either an ON state or an OFF state, the conventional biasing circuitry 14 shown in FIG. 3 is slow to produce the bias signal V_BIAS, and thus cannot quickly transition the RF switching elements 20 between states. Due to the nature of modern RF communications standards, fast switching of RF signals is becoming increasingly essential. Accordingly, biasing circuitry for an RF switching element is needed that is capable of quickly transitioning an RF switching element between an ON state and an OFF state, while minimizing noise introduced into a passing RF signal.

FIG. 4 shows details of the charge pump switching circuitry 34 shown in FIG. 3. For context, the low-dropout voltage regulator 12, the oscillator 32, and the output capacitor 36 are also shown. The charge pump switching circuitry 34 includes a flying capacitor C_FLY including a positive terminal 38 and a negative terminal 40, a first switch SW_1 coupled between the low-dropout voltage regulator 12 and the positive terminal 38 of the flying capacitor C_FLY, a second switch SW_2 coupled between the positive terminal 38 of the flying capacitor and the output capacitor 36, a third switch SW_3 coupled between ground and the negative terminal 40 of the flying capacitor C_FLY, and a fourth switch SW_4 coupled between the negative terminal 40 of the flying capacitor C_FLY and ground (referred to collectively as the switches SW). Each one of the switches SW is coupled to the oscillator 32, such that the oscillating signal V_OSC determines when each switch is in the ON state or the OFF state. Notably, the oscillating signal V_OSC supplied to the second switch SW_2 and the third switch SW_3 is inverted, such that when the first switch SW_1 and the fourth switch SW_4 are in an ON, or closed state, the second switch SW_2 and the third switch SW_3 are in an OFF, or open state, and vice versa. Accordingly, during a first charging cycle, the first switch SW_1 and the fourth switch SW_4 are closed, while the second switch SW_2 and the third switch SW_3 are open, thereby charging the flying capacitor C_FLY to the supply voltage V_SUPP. During a second discharging cycle, the second switch SW_2 and the third switch SW_3 are closed, while the first switch SW_1 and the fourth switch SW_4 are open, thereby discharging the flying capacitor C_FLY across the output capacitor 36. The charging cycle and the discharging cycle are repeated in order to generate the biasing signal V_BIAS.

FIG. 5 shows an additional example of the conventional biasing circuitry 14 shown in FIG. 1. For context, the low-dropout voltage regulator 12 is also shown. The conventional biasing circuitry 14 is a negative charge pump including an oscillator 42, charge pump switching circuitry 44, an output capacitor 46, a voltage detector 48, frequency selection circuitry 50, and one or more frequency dividers 52A-52N (referred to collectively as the frequency dividers 52). In operation, the oscillator 42 receives the regulated supply voltage V_SUPP from the low-dropout voltage regulator 12 and produces a high-frequency oscillating signal V_OSC_HF. Depending on the mode of operation of the conventional biasing circuitry 14, the high frequency oscillating signal V_OSC_HF is either delivered to the charge pump switching circuitry 44 directly, or delivered to the charge pump switching circuitry 44 through the frequency dividers 52. In response to the high frequency oscillating signal V_OSC_HF or the frequency divided high frequency oscillating signal, the charge pump switching circuitry 44 produces a stepped-up output voltage V_SU, as described above. The stepped-up output voltage V_SU is filtered by the output capacitor 46 to produce the biasing signal V_BIAS. The voltage detector 48 senses the output of the charge pump switching circuitry 44 and makes adjustments to the frequency selection circuitry 50 in order to maintain the biasing signal V_BIAS at a desired level.

In a "boost" mode of operation, the high frequency oscillating signal V_OSC_HF is delivered directly to the charge pump switching circuitry 44. In response to the high frequency oscillating signal V_OSC_HF, the conventional biasing circuitry 14 quickly produces a biasing signal V_BIAS. By quickly producing the biasing signal V_BIAS, the state of the RF switching elements 20 may be changed faster than would otherwise be possible. In a normal mode of operation, the high frequency oscillating signal V_OSC_HF is delivered to the charge pump switching circuitry 44 through the frequency dividers 52. Accordingly, the frequency of the signal is reduced, resulting in a slower production of the biasing signal V_BIAS. The conventional biasing circuitry 14 may use the "boost" mode of operation to quickly change the state of the RF switching elements 20, and use the normal mode of operation to maintain the state of the RF switching elements 20. Control circuitry may be coupled to the frequency selection circuitry 50 in order to switch the conventional biasing circuitry 14 between the "boost" mode of operation and the normal mode of operation.

Although effective at quickly changing and maintaining the state of the RF switching elements 20, the conventional biasing circuitry 14 shown in FIG. 5 generates an excessive amount of spurious noise at high frequencies due to the constant generation of the high frequency oscillating output signal V_OSC_HF. The high frequency noise may couple with the RF switching elements 20 and distort passing RF signals, thereby degrading the performance of a device in which the conventional biasing circuitry 14 is incorporated. Accordingly, there is a need for circuitry that is capable of quickly changing the state of one or more RF switching elements while reducing or eliminating noise coupled to the RF switching elements.

SUMMARY

Radio frequency (RF) switching circuitry includes support circuitry for maintaining one or more RF switching elements in either an ON or OFF state. The support circuitry includes a negative charge pump adapted to quickly generate a negative voltage during a "boost" mode of operation, and maintain the negative voltage during a normal mode of operation. The negative charge pump includes an oscillator adapted to generate a high frequency oscillating signal for driving the charge pump during the "boost" mode of operation and a low frequency oscillating signal for driving the charge pump during the normal mode of operation. By generating the high frequency oscillating signal only during a "boost" mode of operation, spurious noise coupled to the RF switch circuitry is minimized during a normal mode of operation.

According to one embodiment, the biasing circuitry further includes a dual output low-dropout power supply. The dual output low-dropout power supply generates a first power supply signal and a second power supply signal. The first power supply signal is used to power the components of the support circuitry. The second power supply signal is used to power the RF switching elements. By splitting the power supply for the support circuitry and the RF switching elements, noise coupled to the RF switching elements is minimized.

According to one embodiment, the support circuitry further includes one or more control signal inputs for controlling the state of the RF switching elements. Each one of the control signal inputs includes a resistor-capacitor (RC) filter. By placing an RC filter at each control signal input, noise coupled to the RF switching elements is minimized.

According to one embodiment, the ground path for each component in the support circuitry is isolated from the ground path of the RF switching elements. By separating the ground paths for the components of the support circuitry from those of the RF switching elements, noise coupled to the RF switching elements is minimized.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
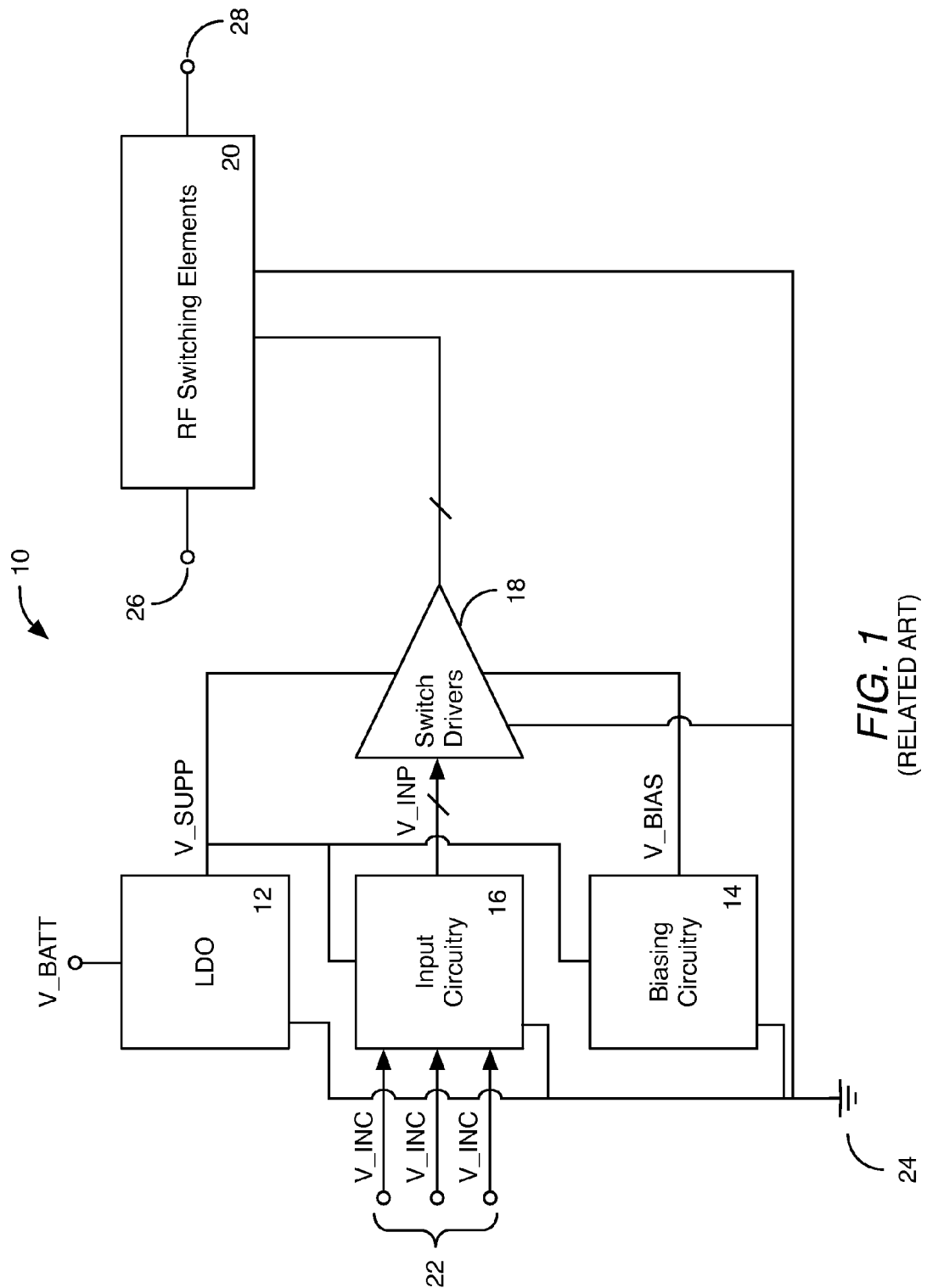
FIG. 1 shows an example of conventional RF switching circuitry.
Figure 2B:
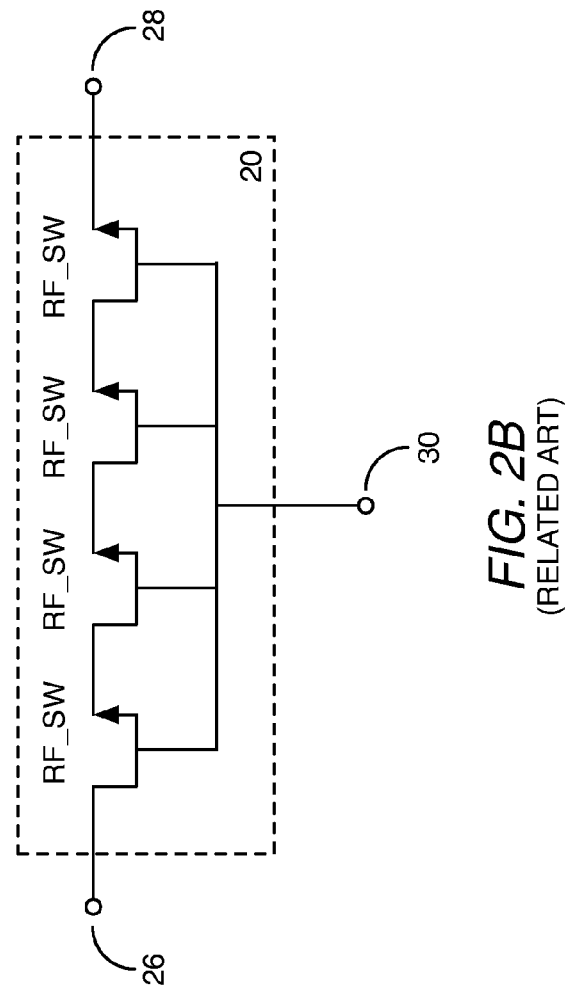
FIGS. 2A and 2B show exemplary configurations of RF switching elements.
Figure 2A:
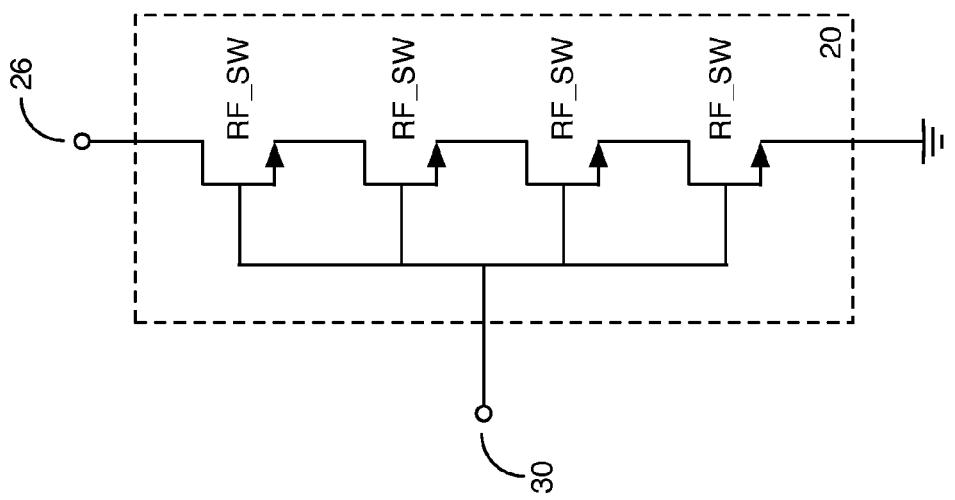
Figure 3:
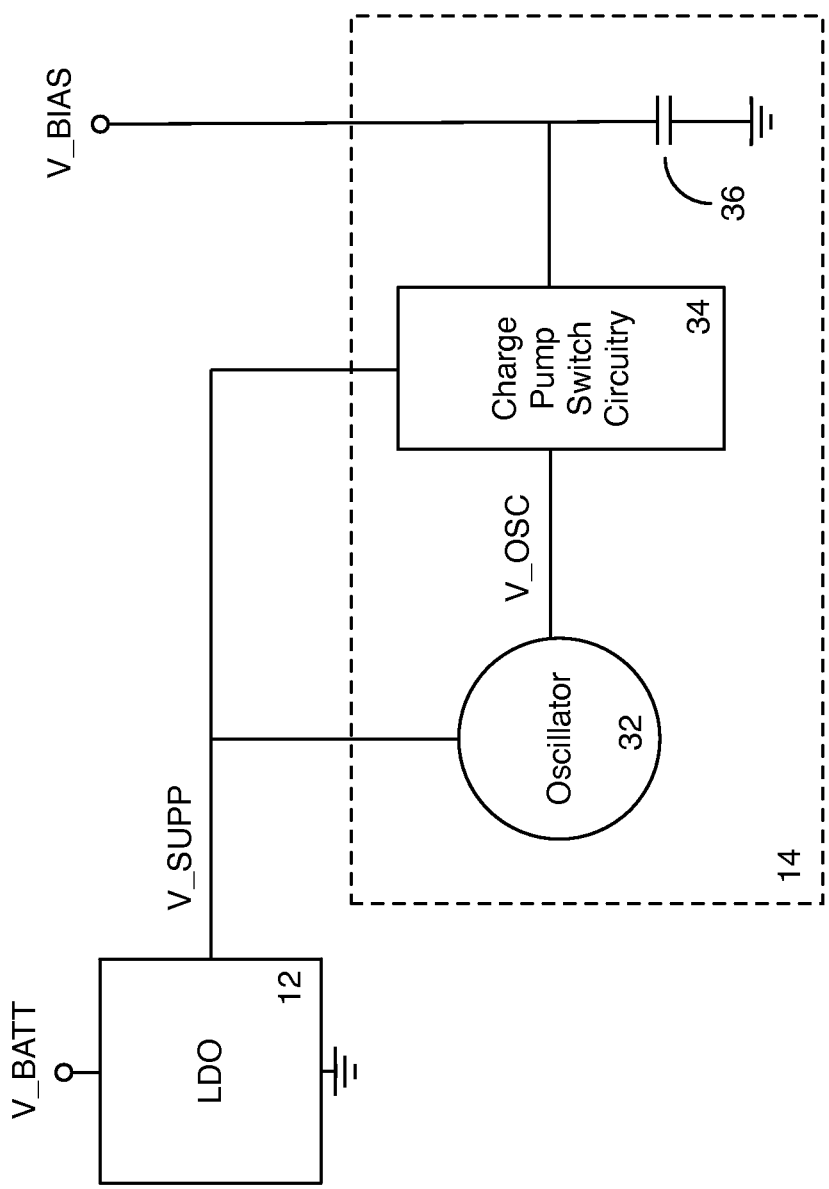
FIG. 3 shows an example of conventional biasing circuitry for one or more RF switching elements.
Figure 4:
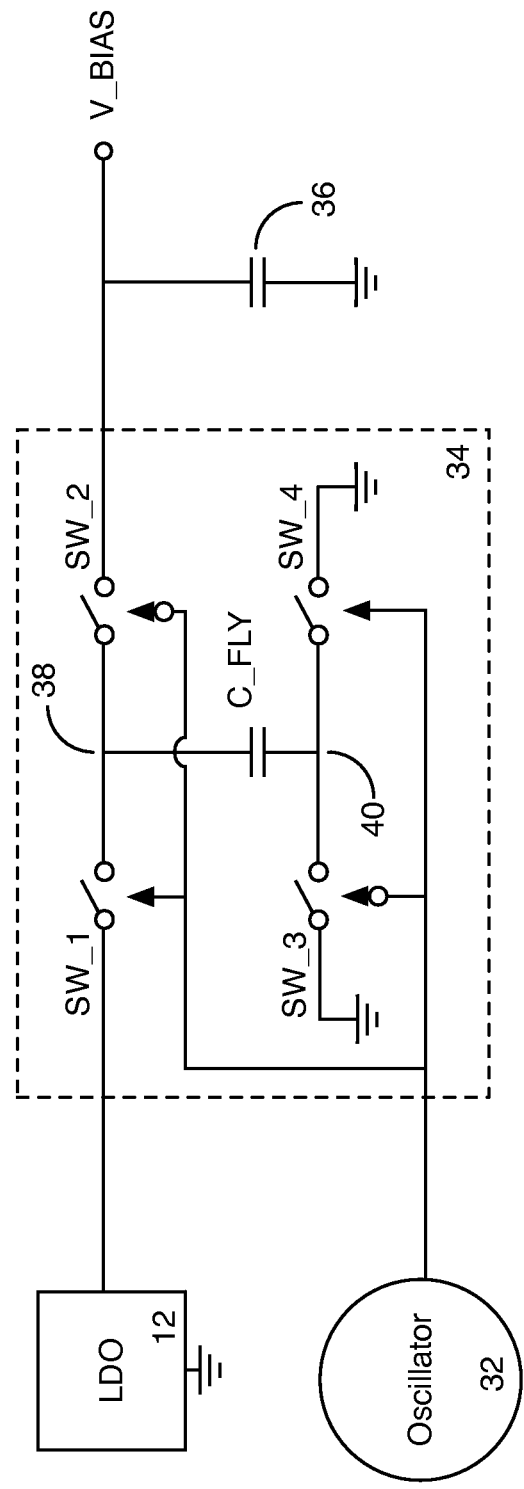
FIG. 4 shows details of the charge pump switching circuitry shown in FIG. 3.
Figure 5:
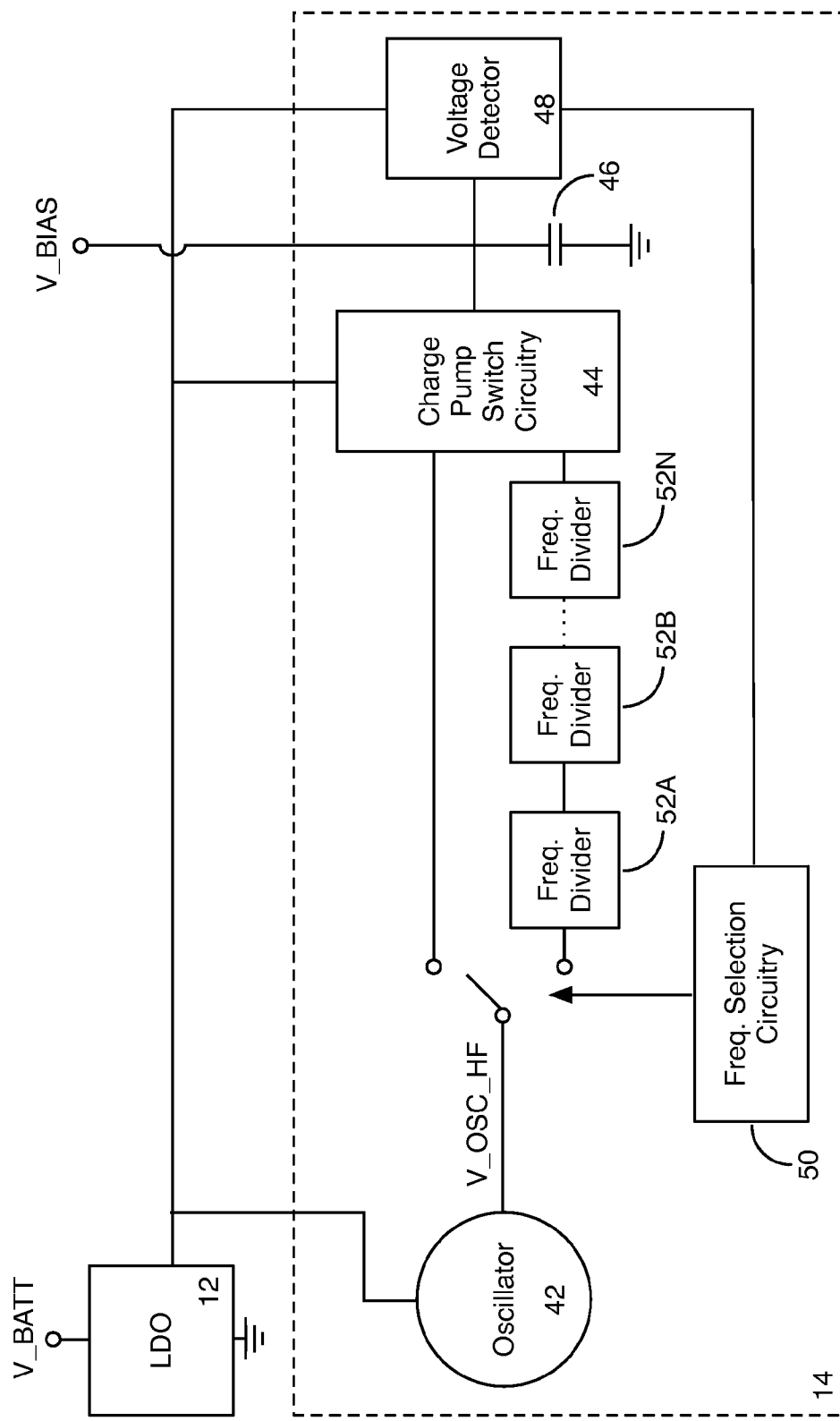
FIG. 5 shows an additional example of conventional biasing circuitry for one or more RF switching elements.
Figure 6:
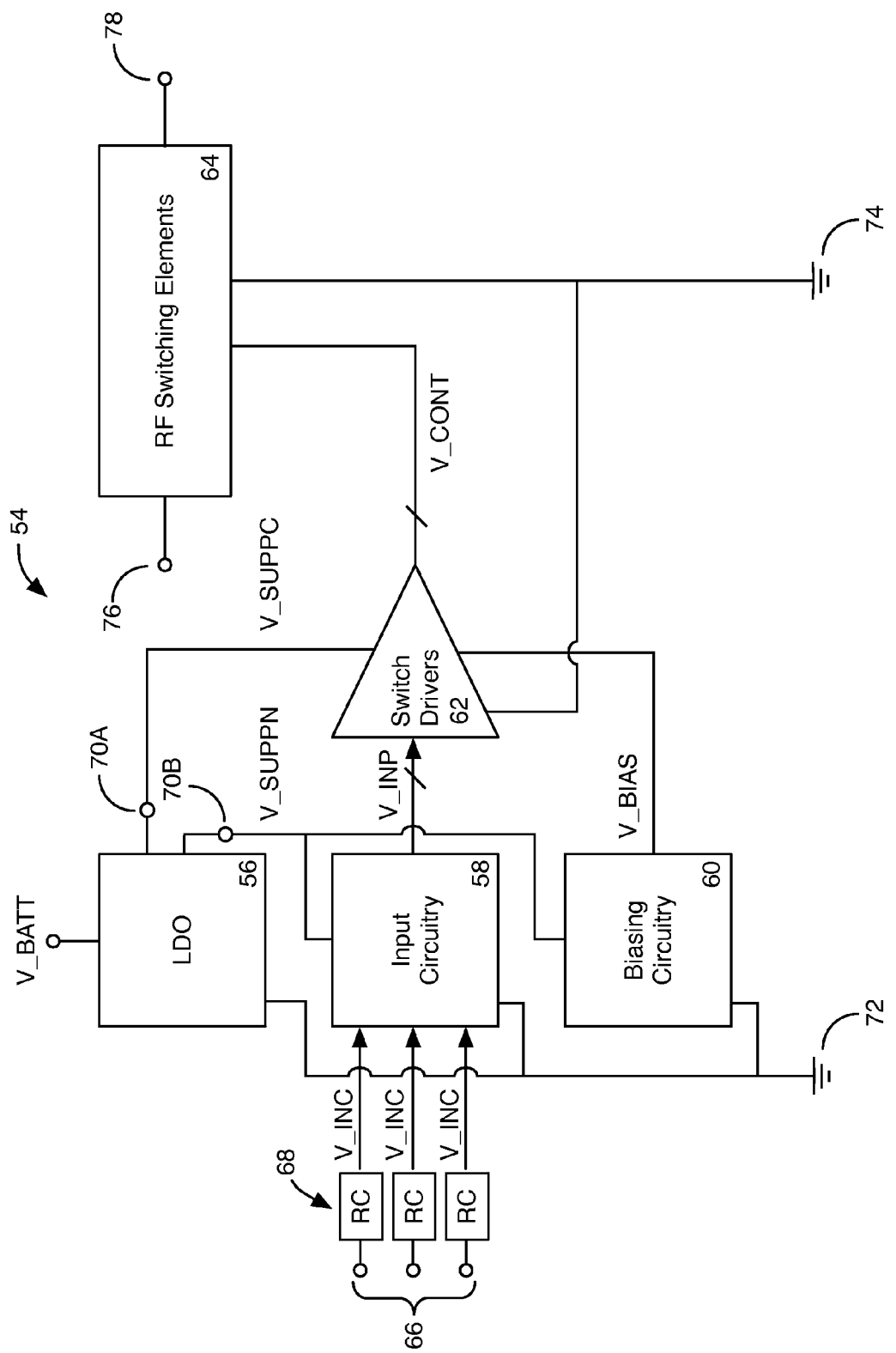
FIG. 6 shows RF switching circuitry according to one embodiment of the present disclosure.

Turning now to FIG. 6, radio frequency (RF) switching circuitry 54 is shown according to one embodiment of the present disclosure. The RF switching circuitry 54 includes a dual output low-dropout voltage regulator 56, input circuitry 58, biasing circuitry 60, switch driver circuitry 62, one or more RF switching elements 64, a plurality of input control terminals 66, and a plurality of RC filters 68. The dual output low-dropout voltage regulator 56 includes a first output terminal 70A and a second output terminal 70B. The first output terminal 70A is coupled to the switch driver circuitry 62. The second output terminal 70B is coupled to the input circuitry 58 and the biasing circuitry 60. Each one of the input control terminals 66 are coupled to the input circuitry 58 through one of the RC filters 68. The output of the input circuitry 58 is coupled to an input of the switch driver circuitry 62. The output of the biasing circuitry 60 is coupled to an additional input of the switch driver circuitry 62. The output of the switch driver circuitry 62 is coupled to the RF switching elements 64. Each one of the dual output low-dropout voltage regulator 56, the input circuitry 58, and the biasing circuitry 60 include a connection to a first common ground 72. The switch driver circuitry 62 and the RF switching elements 64 include a connection to a second common ground 74.

In operation, the dual output low-dropout voltage regulator 56 receives a battery voltage V_BATT and produces a first regulated output signal V_SUPPC and a second regulated output signal V_SUPPN. The second regulated output signal V_SUPPN is delivered to the biasing circuitry 60, which steps up the second regulated output signal V_SUPPN to produce a biasing signal V_BIAS. The input circuitry 58 receives one or more input control signals V_INC through the plurality of RC filters 68, and processes the input control signals V_INC to produce a plurality of processed control signals V_INP. The processed control signals V_INP and the biasing signal V_BIAS are delivered to the switch driver circuitry 62 together with the first regulated output signal V_SUPPC and the biasing signal V_BIAS, where they are used to generate a control signal V_CONT for controlling the state of the one or more RF switching elements 64. Depending on the state of the one or more RF switching elements 64, an RF signal presented at an input terminal 76 to the RF switching elements 64 is selectively passed to an output terminal 78 of the RF switching elements 64.

Notably, the RF switching circuitry 54 includes several features to isolate noise coupled to the switch driver circuitry 62 and the RF switching elements 64. By using the dual output low-dropout voltage regulator 56, noise generated by the biasing circuitry 60 is isolated from the switch driver circuitry 62 and the RF switching elements 64. Further, by filtering each one of the input control signals V_INC with the plurality of RC filters 68, noise coupled to the switch driver circuitry 62 and the RF switching elements 64 as a result of distortion in the input control signals V_INC is isolated. Finally, by separating the first common ground 72 and the second common ground 74, noise coupled to the switch driver circuitry 62 and the RF switching elements 64 is further isolated. By isolating noise coupled to the switch driver circuitry 62 and the RF switching elements 64, the performance of a device in which the RF switching circuitry 54 is incorporated may be improved.

Figure 7:
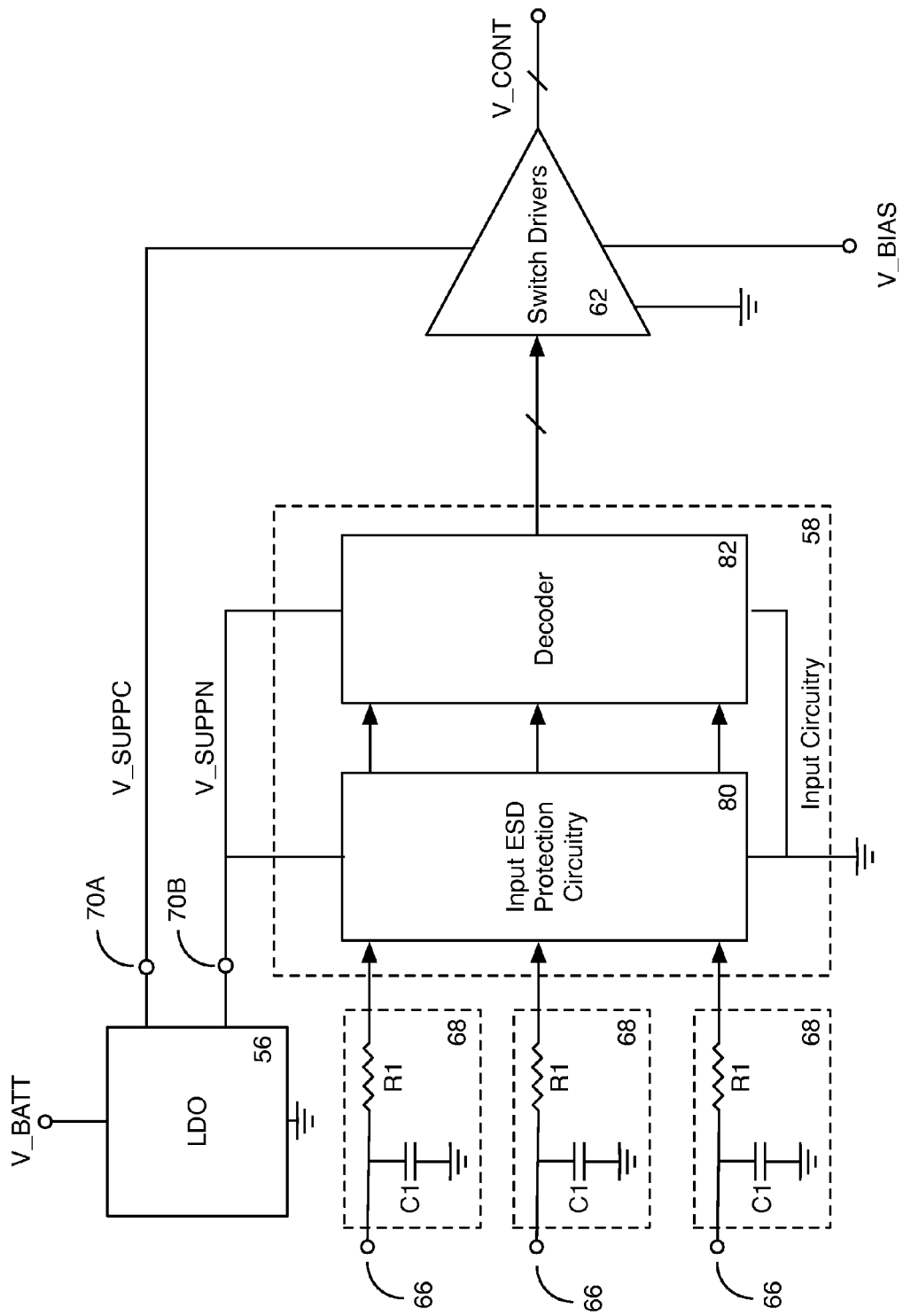
FIG. 7 shows details of the input circuitry shown in FIG. 6 according to one embodiment of the present disclosure.

FIG. 7 shows details of the input circuitry 58 and the RC filters 68 shown in FIG. 6 according to one embodiment of the present disclosure. For context, the dual output low-dropout voltage regulator 56 and the switch driver circuitry 62 are shown. Each one of the RC filters 68 includes a resistor R1 and a capacitor C1. The values of the resistor R1 and the capacitor C1 are chosen in order to generate a filter response for minimizing undesirable noise that may be present in the input control signals V_INC. Accordingly, noise in the input control signals V_INC is minimized, thereby reducing noise passed to the switch driver circuitry 62 and ultimately the RF switching elements 64. By minimizing noise passed to the switch driver circuitry 62 and the RF switching elements 64, RF signals passed through the RF switching elements 64 maintain their signal integrity, thereby increasing the performance of a device in which the RF switching circuitry 54 is incorporated.

The input circuitry 58 includes electrostatic discharge (ESD) protection circuitry 80 and decoder circuitry 82. The ESD protection circuitry 80 is coupled to the RC filters 68 in order to receive one or more input control signals V_INC. One or more outputs of the ESD protection circuitry 80 are coupled to the decoder circuitry 82. The output of the decoder circuitry 82 is coupled to the switch driver circuitry 62. In operation, the ESD protection circuitry 80 receives one or more filtered input control signals V_INC from the RC filters 68 and processes the signals to prevent damage to the surrounding circuitry due to ESD. The input control signals V_INC are then delivered to the decoder circuitry 82, where they are processed and delivered to the switch driver circuitry 62. For example, the decoder circuitry 82 may multiplex the input control signals V_INC into a single control signal.

Figure 8:
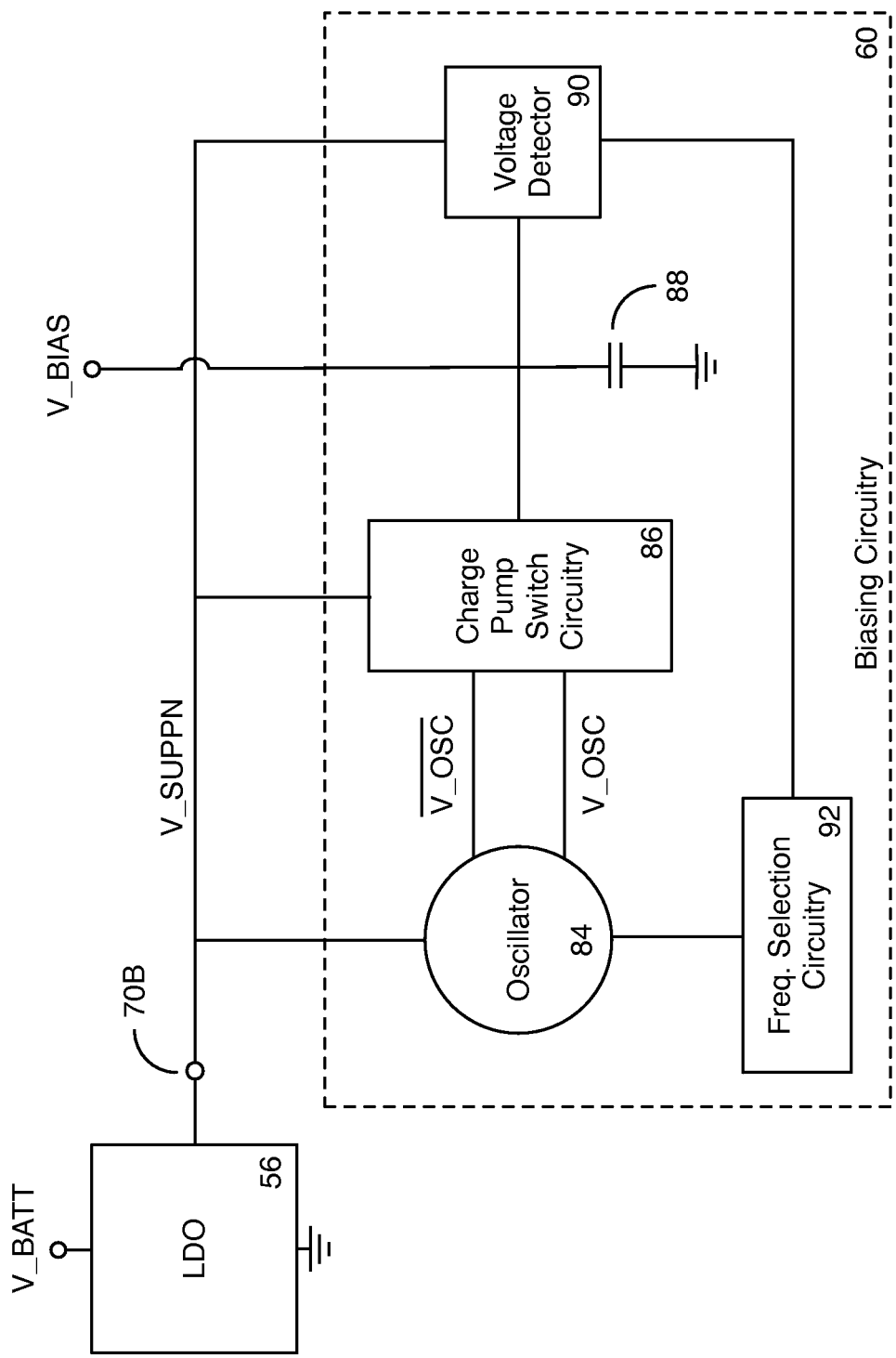
FIG. 8 shows details of the biasing circuitry shown in FIG. 6 according to one embodiment of the present disclosure.

FIG. 8 shows details of the biasing circuitry 60 shown in FIG. 6 according to one embodiment of the present disclosure. For context, the dual output low-dropout voltage regulator 56 is also shown. The biasing circuitry 60 includes a dual mode oscillator 84, charge pump switching circuitry 86, an output capacitor 88, a voltage detector 90, and frequency selection circuitry 92. The second output terminal 70B of the dual output low-dropout voltage regulator 56 is coupled to the dual mode oscillator 84, the charge pump switching circuitry 86, and the voltage detector 90. The outputs of the dual mode oscillator 84 are coupled to the charge pump switching circuitry 86. The output of the charge pump switching circuitry 86 is coupled to the positive terminal of the output capacitor 88, which is coupled to an input of the voltage detector 90. The voltage detector 90 is coupled to the frequency selection circuitry 92, which is coupled back to the dual mode oscillator 84 to form a feedback loop for maintaining the bias signal V_BIAS at a desirable level.

According to one embodiment, the biasing circuitry 60 is adapted to produce a negative biasing signal, such as −2.5 V, in order to maintain the RF switching elements 64 in an OFF state.

In operation, the dual mode oscillator 84 receives the second regulated output signal V_SUPPN and generates an oscillating signal V_OSC and a differential oscillating signal $\overline{V\_OSC}$. The oscillating signal V_OSC, the differential oscillating signal $\overline{V\_OSC}$, and the second regulated output signal V_SUPPN are used by the charge pump switching circuitry 86 to generate a stepped-up output voltage V_SU. The stepped-up output voltage V_SU is filtered by the output capacitor 88 to generate the biasing signal V_BIAS. The voltage detector 90 senses the level of the biasing signal V_BIAS, and adjusts one or more operating parameters of the biasing circuitry 60 in order to maintain a desired level of the biasing signal V_BIAS.

Notably, the dual mode oscillator 84 is adapted to generate a high frequency signal only in a "boost" mode of operation of the biasing circuitry 60. In a "boost" mode of operation, the dual mode oscillator 84 will deliver a high frequency oscillating signal V_OSC to the charge pump switching circuitry 86, which will result in the fast production of the biasing signal V_BIAS. By quickly generating the biasing signal V_BIAS, the state of the RF switching elements 64 may be changed faster than would otherwise be possible. In a normal mode of operation of the biasing circuitry 60, the dual mode oscillator 84 will deliver a normal oscillating signal V_OSC to the charge pump switching circuitry 86, which will result in a slower production of the biasing signal V_BIAS. Accordingly, the "boost" mode of operation may be used to quickly change the state of the RF switching elements 64, while the normal mode of operation may be used to maintain the state of the RF switching elements 64. According to one embodiment, the dual mode oscillator 84 generates an 8 MHz oscillating signal in the "boost" mode of operation, and generates a 1 MHz oscillating signal in a normal mode of operation. By generating a high frequency signal only in a "boost" mode of operation, high frequency noise coupled to the switch driver circuitry 62 and the RF switching elements 64 is minimized, thereby improving the performance of a device in which the RF switching circuitry 54 is incorporated.

Figure 9:
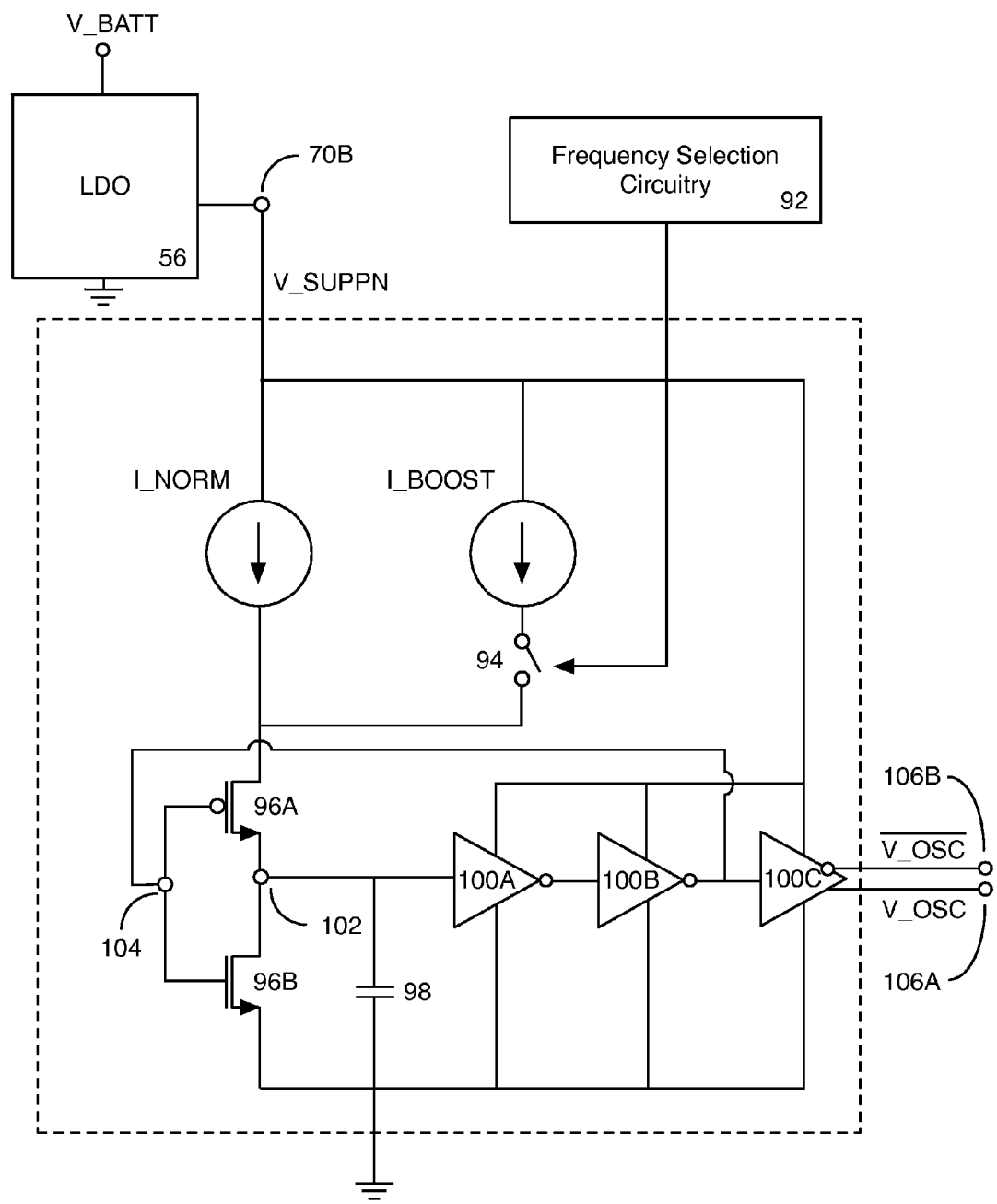
FIG. 9 shows details of the dual mode oscillator shown in FIG. 8 according to one embodiment of the present disclosure.

FIG. 9 shows details of the dual mode oscillator 84 shown in FIG. 8 according to one embodiment of the present disclosure. For context, the dual output low-dropout voltage regulator 56 and the frequency selection circuitry 92 are also shown. The dual mode oscillator 84 includes a normal current source I_NORM, a "boost" current source I_BOOST, a "boost" mode selection switch 94, a first oscillator switching device 96A, a second oscillator switching device 96B, a holding capacitor 98, a first inverter 100A, a second inverter 100B, and an output inverter 100C. The normal current source I_NORM is coupled between the second output terminal 70B of the dual output low-dropout voltage regulator 56 and the drain of the first oscillator switching device 96A. The "boost" current source I_BOOST and the "boost" mode selection switch 94 are coupled in parallel with the normal current source I_NORM. The source of the first oscillator switching device 96A is coupled to a first node 102. The gate of the first oscillator switching device 96A is coupled to a second node 104. The drain of the second oscillator switching device 96B is coupled to the first node 102. The gate of the second oscillator switching device 96B is coupled to the second node 104. The source of the second oscillator switching device 96B is coupled to ground. The holding capacitor 98 is coupled between the first node 102 and ground.

The first inverter 100A, the second inverter 100B, and the output inverter 100C are coupled in series between the second node 104 of the dual mode oscillator 84 and a pair of differential output terminals 106. The inverters 100 receive the oscillating signal produced by the holding capacitor 98 together with the second regulated output signal V_SUPPN, and generate a square-wave oscillating signal at the differential output terminals 106. The differential output terminals include a first output terminal 106A and a second output terminal 106B. The first output terminal 106A produces the oscillating signal V_OSC, while the second output terminal 106B produces the differential oscillating signal $\overline{V\_OSC}$.

In operation, when the initial voltage on the holding capacitor 98 is low, current from the normal current source I_NORM will flow through the first oscillator switching device 96A and charge the holding capacitor 98. When the voltage across the holding capacitor 98 reaches a certain level, the first oscillator switching device 96A will turn OFF, and the second oscillator switching device 96B will turn ON. Accordingly, the voltage across the holding capacitor 98 will be discharged to ground. This cycle will repeat in order to create a periodic signal at the first node 102. The periodic signal will propagate through each one of the inverters 100 in order to generate the oscillating signal V_OSC at the first output terminal 106A of the dual mode oscillator 84, and the differential oscillating signal $\overline{V\_OSC}$ at the second output terminal 106B of the dual mode oscillator 84.

Notably, the frequency of the oscillating signal V_OSC and the differential oscillating signal $\overline{V\_OSC}$ is directly proportional to the current applied to the drain of the first oscillator switching device 96A. Accordingly, turning on the "boost" mode selection switch 94, which will allow the output of the "boost" current source I_BOOST to combine with the output of the normal current source I_NORM, will cause the frequency of the oscillating signal V_OSC and the differential oscillating signal $\overline{V\_OSC}$ to increase. By increasing the frequency of the oscillating signal V_OSC and the differential oscillating signal $\overline{V\_OSC}$, the charge pump switching circuitry 86 is able to more quickly generate a voltage, thereby allowing the biasing circuitry 60 to quickly change the state of one or more of the RF switching elements 64. Further, by only producing a high frequency oscillating signal during a "boost" mode of operation, noise coupled to the switch driver circuitry 62 and the RF switching elements 64 is minimized.

Figure 10:
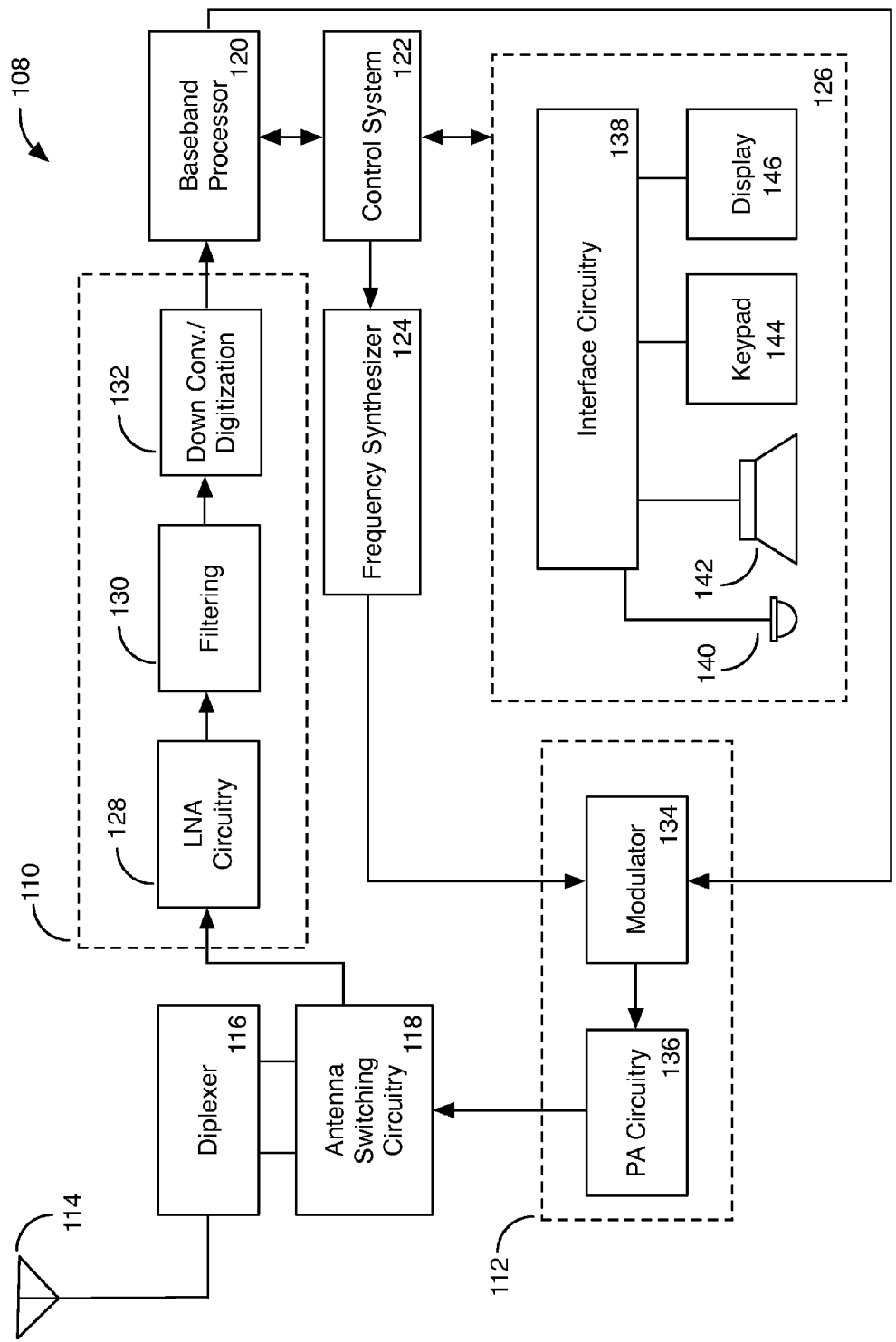
FIG. 10 shows details of a mobile terminal incorporating the RF switching circuitry shown in FIG. 6 according to one embodiment of the present disclosure.

One application of the RF switching circuitry 54 is for directing the flow of RF signals in a mobile terminal 108, the basic architecture of which is shown in FIG. 10. The mobile terminal 108 may include a receiver front end 110, a radio frequency transmitter section 112, an antenna 114, diplexer circuitry 116, antenna switching circuitry 118, a baseband processor 120, a control system 122, a frequency synthesizer 124, and an interface 126. The receiver front end 110 receives information bearing radio frequency signals from one or more remote transmitters provided by a base station (not shown). The antenna switching circuitry 118, which may include the RF switching circuitry 54 shown in FIG. 6, receives the RF signals through diplexer circuitry 116, and directs the RF signal to the proper low noise amplifier (LNA) in LNA circuitry 128 located in the receiver front end 110. The LNA circuitry 128 amplifies the RF signals, and delivers them to filtering circuitry 130. The filtering circuitry 130 minimizes broadband interference in the received signal, while down conversion and digitization circuitry 132 down converts the filtered, received signal to an intermediate or baseband frequency signal, which is then digitized into one or more digital streams. The receiver front end 110 typically uses one or more mixing frequencies generated by the frequency synthesizer 124. The baseband processor 120 processes the digitized received signal to extract the information or data bits conveyed in the received signal. This processing typically comprises demodulation, decoding, and error correction operations. As such, the baseband processor 120 is generally implemented in one or more digital signal processors (DSPs).

On the transmit side, the baseband processor 120 receives digitized data, which may represent voice, data, or control information, from the control system 122, which it encodes for transmission. The encoded data is output to the radio frequency transmitter section 112, where it is used by a modulator 134 to modulate a carrier signal that is at a desired transmit frequency. Power amplifier circuitry 136 amplifies the modulated carrier signal to a level appropriate for transmission, and delivers the amplified and modulated carrier signal to the antenna 114 through the antenna switching circuitry 118 and the diplexer circuitry 116.

A user may interact with the mobile terminal 108 via the interface 126, which may include interface circuitry 138 associated with a microphone 140, a speaker 142, a keypad 144, and a display 146. The interface circuitry 138 typically includes analog-to-digital converters, digital-to-analog converters, amplifiers, and the like. Additionally, it may include a voice encoder/decoder, in which case it may communicate directly with the baseband processor 120. The microphone 140 will typically convert audio input, such as the user's voice, into an electrical signal, which is then digitized and passed directly or indirectly to the baseband processor 120. Audio information encoded in the received signal is recovered by the baseband processor 120, and converted by the interface circuitry 138 into an analog signal suitable for driving the speaker 142. The keypad 144 and the display 146 enable the user to interact with the mobile terminal 108, input numbers to be dialed, address book information, or the like, as well as monitor call progress information.

Those skilled in the art will recognize improvements and modifications to the preferred embodiments of the present disclosure. All such improvements and modifications are considered within the scope of the concepts disclosed herein and the claims that follow.

What is claimed is:

1. Support circuitry for maintaining the state of one or more RF switching elements comprising:
   a dual-mode oscillator configured to generate a high frequency oscillating signal during a boost mode of operation and generate a low frequency oscillating signal during a normal mode of operation;
   frequency selection circuitry coupled to the dual-mode oscillator and configured to switch the dual-mode oscillator between the boost mode of operation and the normal mode of operation;
   charge pump switching circuitry configured to receive an oscillating signal from the dual-mode oscillator and a supply voltage and produce a stepped-up output voltage; and
   input circuitry comprising a plurality of input terminals each coupled to a resistor capacitor (RC) filter configured to attenuate high frequency noise in each one of a plurality of input control signals received at the input terminals.

2. The support circuitry of claim 1 wherein the high frequency oscillating signal is about 8 MHz and the low frequency oscillating signal is about 1 MHz.

3. The support circuitry of claim 1 further comprising an output capacitor coupled between an output of the charge pump switching circuitry and ground and configured to filter the stepped-up output voltage to produce a biasing voltage.

4. The support circuitry of claim 3 further comprising a voltage detector coupled between the output of the charge pump switching circuitry and the frequency selection circuitry and configured to maintain the biasing voltage at a desired level by sending one or more control signals to the frequency selection circuitry.

5. The support circuitry of claim 4 wherein the plurality of input control signals are configured to control the state of the one or more RF switching elements.

6. The support circuitry of claim 4 wherein the charge pump switching circuitry is configured to use the high frequency oscillating signal to quickly generate the biasing voltage during the boost mode of operation, and use the low frequency oscillating signal to maintain the biasing voltage during the normal mode of operation.

7. The support circuitry of claim 1 further comprising switch driver circuitry configured to receive the plurality of input control signals from the input circuitry along with the biasing voltage from the output capacitor and generate one or more output control signals for controlling the state of the one or more RF switching elements.

8. The support circuitry of claim 7 further comprising a dual output low-dropout voltage regulator configured to produce a first supply voltage and a second supply voltage, wherein the first supply voltage is delivered to the switch driver circuitry, and the second supply voltage is delivered to the dual-mode oscillator, the charge pump switching circuitry, the voltage detector, and the input circuitry.

9. The support circuitry of claim 8 further comprising a first common ground and a second common ground, wherein the switch driver circuitry is coupled to the first common ground, and the dual-output low-dropout voltage regulator, the input circuitry, and the output capacitor are coupled to the second common ground.

10. A mobile terminal comprising:
a power amplifier (PA) for amplifying signals to be transmitted from the mobile terminal;
a receiver configured to receive signals to be processed by the mobile terminal; and
antenna switching circuitry configured to selectively place an antenna in contact with the PA and the receiver, the antenna switching circuitry comprising:
one or more RF switching elements; and
support circuitry for maintaining the state of the one or more RF switching elements, the support circuitry comprising:
a dual-mode oscillator configured to generate a high frequency oscillating signal during a boost mode of operation and generate a low frequency oscillating signal during a normal mode of operation;
frequency selection circuitry coupled to the dual-mode oscillator and configured to switch the dual-mode oscillator between the boost mode of operation and the normal mode of operation;
charge pump switching circuitry configured to receive an oscillating signal from the dual-mode oscillator and a supply voltage and produce a stepped-up output voltage; and
input circuitry comprising a plurality of input terminals each coupled to a resistor capacitor (RC) filter configured to attenuate high frequency noise in each one of a plurality of input control signals received at the input terminals.

11. The mobile terminal of claim 10 wherein the high frequency oscillating signal is about 8 MHz and the low frequency oscillating signal is about 1 MHz.

12. The mobile terminal of claim 10 wherein the support circuitry further comprises an output capacitor coupled between an output of the charge pump switching circuitry and ground and configured to filter the stepped-up output voltage to produce a biasing voltage.

13. The mobile terminal of claim 12 wherein the support circuitry further comprises a voltage detector coupled between the output of the charge pump switching circuitry and the frequency selection circuitry and configured to maintain the biasing voltage at a desired level by sending one or more control signals to the frequency selection circuitry.

14. The mobile terminal of claim 13 wherein the plurality of input control signals are configured to control the state of the one or more RF switching elements.

15. The mobile terminal of claim 13 wherein the charge pump switching circuitry is configured to use the high frequency oscillating signal to quickly generate the biasing voltage during the boost mode of operation, and use the low frequency oscillating signal to maintain the biasing voltage during the normal mode of operation.

16. The mobile terminal of claim 10 wherein the support circuitry further comprises switch driver circuitry configured to receive the plurality of input control signals from the input circuitry along with the biasing voltage from the output capacitor and generate one or more output control signals for controlling the state of the one or more RF switching elements.

17. The mobile terminal of claim 16 wherein the support circuitry further comprises a dual output low-dropout voltage regulator configured to produce a first supply voltage and a second supply voltage, wherein the first supply voltage is delivered to the switch driver circuitry, and the second supply voltage is delivered to the dual-mode oscillator, the charge pump switching circuitry, the voltage detector, and the input circuitry.

18. The mobile terminal of claim 17 further comprising a first common ground and a second common ground, wherein the switch driver circuitry and the RF switching elements are coupled to the first common ground, and the dual-output low-dropout voltage regulator, the input circuitry, and the output capacitor are coupled to the second common ground.

* * * * *